(12) United States Patent
Tachikawa (10) Patent No.: US 10,142,525 B2
(45) Date of Patent: Nov. 27, 2018

(54) DISPLAY APPARATUS

(71) Applicant: FUJITSU LIMITED, Kawasaki-shi, Kanagawa (JP)

(72) Inventor: Tadanori Tachikawa, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/677,154

(22) Filed: Aug. 15, 2017

(65) Prior Publication Data

US 2018/0084166 A1    Mar. 22, 2018

(30) Foreign Application Priority Data

Sep. 20, 2016   (JP) .................................. 2016-182736

(51) Int. Cl.
*H04N 5/225*    (2006.01)
*H04N 5/232*    (2006.01)

(52) U.S. Cl.
CPC ......... *H04N 5/2253* (2013.01); *H04N 5/2252* (2013.01); *H04N 5/2254* (2013.01); *H04N 5/2257* (2013.01); *H04N 5/23241* (2013.01)

(58) Field of Classification Search
CPC ............... H04N 5/2253; H04N 5/2254; H04N 5/23241; H04N 5/2252
See application file for complete search history.

(56) References Cited

U.S. PATENT DOCUMENTS

| | | | |
|---|---|---|---|
| 5,880,928 A * | 3/1999 | Ma ..................... | G06F 1/1616 361/679.23 |
| 6,788,529 B2 * | 9/2004 | Homer ................. | G06F 1/1616 312/223.2 |
| 6,812,958 B1 * | 11/2004 | Silvester ............. | G06F 1/1607 348/207.1 |
| 7,435,018 B2 * | 10/2008 | Huang .................. | G03B 17/04 348/373 |
| 7,800,648 B2 * | 9/2010 | Lu ....................... | H04N 5/2252 348/207.1 |
| 8,224,179 B2 * | 7/2012 | Lin ....................... | G03B 17/02 348/376 |
| 8,861,189 B2 * | 10/2014 | Chen ..................... | G03B 29/00 348/207.1 |
| 9,332,176 B2 * | 5/2016 | Jang .................... | H04N 5/23222 |
| 9,392,148 B2 * | 7/2016 | Kim ...................... | G06F 1/1605 |
| 9,529,441 B2 * | 12/2016 | Kim ...................... | G06F 3/017 |
| D793,465 S * | 8/2017 | Kong .......................... | D14/439 |
| 9,762,780 B2 * | 9/2017 | Jung ................... | H04N 5/2257 |
| 2007/0253703 A1 * | 11/2007 | Tsai ..................... | G03B 17/02 396/429 |

(Continued)

FOREIGN PATENT DOCUMENTS

JP    2000-194450    7/2000
JP    2014-6932      1/2014

*Primary Examiner* — Timothy J Henn
(74) *Attorney, Agent, or Firm* — Staas & Halsey LLP (57) ABSTRACT

A display apparatus includes: a display part; a rail member provided on a back surface of the display part; and an imaging unit placed in engagement with the rail member, wherein a lens included in the imaging unit is exposed outside the display part in a first state in which the imaging unit is moved to a first end of the rail member, and is located behind the back surface of the display part in a second state in which the imaging unit is moved to a second end of the rail member.

10 Claims, 12 Drawing Sheets

(56) References Cited

U.S. PATENT DOCUMENTS

2014/0028777 A1\* 1/2014 Koberling ............ H04N 5/2251
                                                          348/14.01
2017/0126937 A1\* 5/2017 Evans, V ............. H04N 5/2252
2018/0029534 A1\* 2/2018 De Wind ............... B60K 35/00

\* cited by examiner

DISPLAY APPARATUS

CROSS-REFERENCE TO RELATED APPLICATION

This application is based upon and claims the benefit of priority of the prior Japanese Patent Application No. 2016-182736, filed on Sep. 20, 2016, the entire contents of which are incorporated herein by reference.

FIELD

The embodiments discussed herein are related to a display apparatus.

BACKGROUND

Display apparatuses equipped with a camera have been used.

Related arts are disclosed in Japanese Laid-open Patent Publication Nos. 2000-194450 and 2014-006932.

SUMMARY

According to an aspect of the embodiments, a display apparatus includes: a display part; a rail member provided on a back surface of the display part; and an imaging unit placed in engagement with the rail member, wherein a lens included in the imaging unit is exposed outside the display part in a first state in which the imaging unit is moved to a first end of the rail member, and is located behind the back surface of the display part in a second state in which the imaging unit is moved to a second end of the rail member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

When a camera is placed within the frame of a display apparatus, the frame is increased in width to have the space for housing the camera. This may hinder adoption of a narrow-frame design. When the camera is placed within the frame, the lens is exposed even when image recording is not intended. Thus, recording unintended by a user might occur due to, for example, an erroneous operation.

For example, a display apparatus may be provided, which is equipped with a camera while having a small frame width of the display apparatus and reducing recording unintended by a user.

The display apparatus may be a desktop personal computer (PC), for example.

Figure 1:
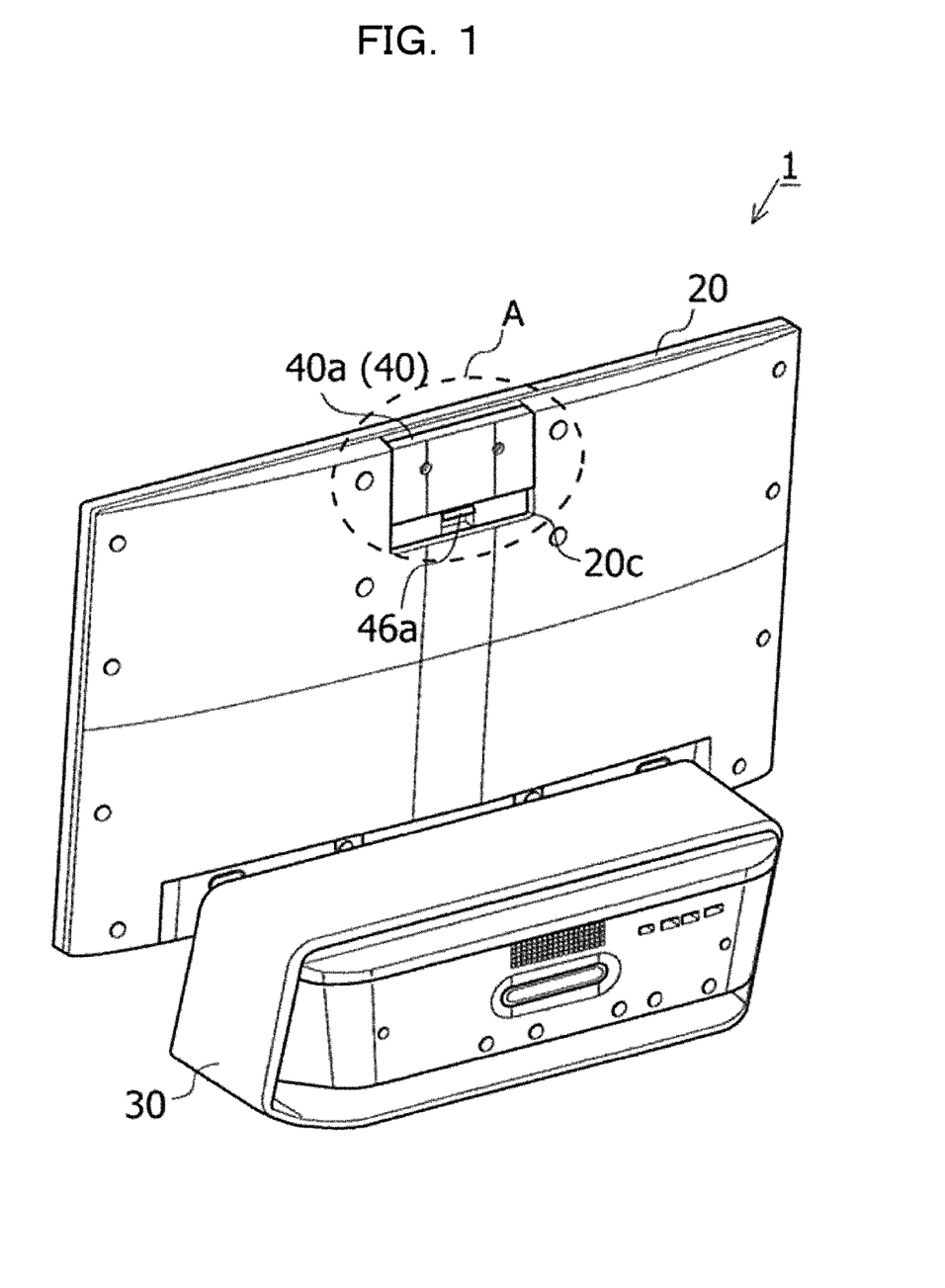
FIG. 1 illustrates an exemplary desktop personal computer (PC)
Figure 2:
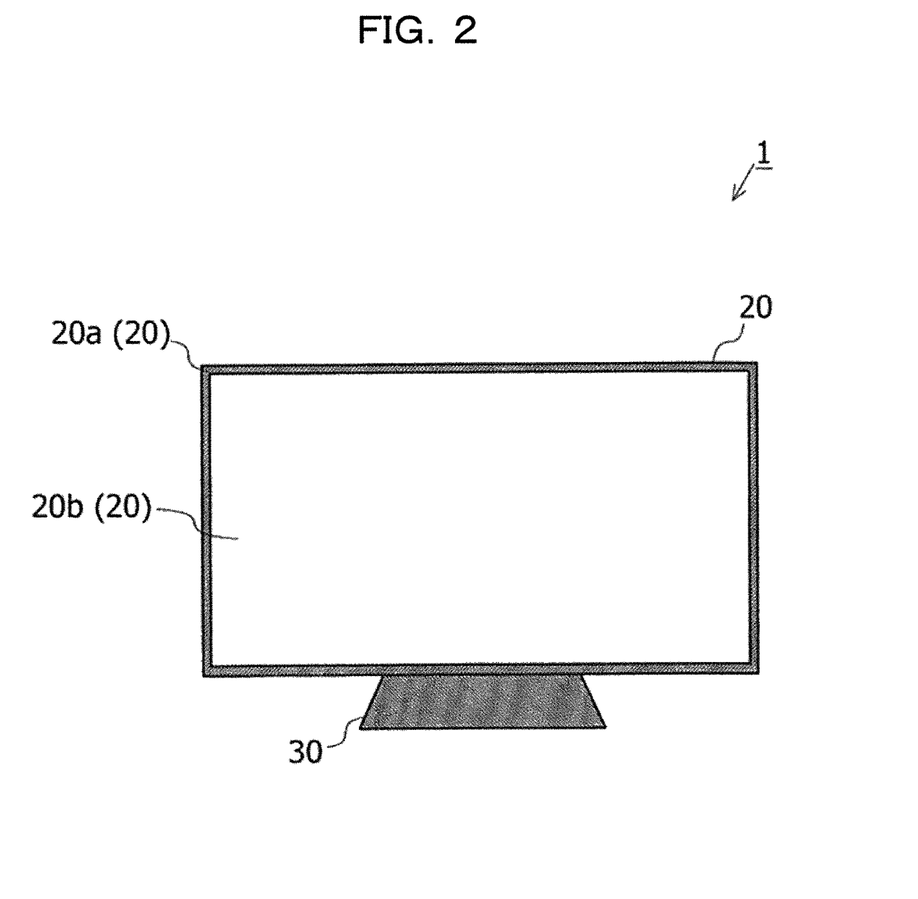
FIG. 2 illustrates the exemplary desktop PC.

For example, a desktop PC having a camera unit on the back surface of a display part may be provided. FIGS. 1 and 2 illustrate an exemplary desktop PC. FIG. 1 is an exemplary rear view of a desktop PC 1, and FIG. 2 is an exemplary front view of the desktop PC 1. The desktop PC 1 includes a display part 20 and a body part 30. A camera unit 40 is installed in an upper portion of the back surface of the display part 20. The camera unit 40 is slidable up and down. At an extended-up position and a retracted-down position, the camera unit 40 is locked against sliding further upward and downward. By being locked at the extended-up position, for example, the camera unit 40 may be able to perform recording in a stable condition. The camera unit 40 may be unlocked with a press of an unlock button 46a. In use, the camera unit 40 is extended up. Not in use, the camera unit 40 is retracted in the back surface of the display part 20. When retracted, the camera unit 40 does not protrude from the display part 20. In FIGS. 1 and 2, the camera unit 40 is retracted. The desktop PC 1 may be an example of a display apparatus. The state where the camera unit 40 is retracted may be an example of a second state.

The body part 30 includes a processor, a memory, a hard disk drive (HDD), a speaker, and a power supply unit. The body part 30 processes various kinds of information when the processor executes programs which are loaded into the memory to be executable. The body part 30, for example, outputs results of the information processing to a screen 20b of the display part 20. The desktop PC 1 supplies power to, for example, the camera unit 40 from the power supply unit in the body part 30.

The display part 20 includes the screen 20b and a frame 20a surrounding the screen 20b. The display part 20 outputs the various kinds of information from the body part 30 to the screen 20b. The display part 20 includes a recess 20c in an upper portion of the back surface, substantially in the center of the width of the display part 20. The recess 20c is large enough to accommodate the camera unit 40. The camera unit 40 is placed in the recess 20c. When accommodated in the recess 20c, a top surface 40a of the camera unit 40 may be substantially as high as the frame 20a of the display part 20. Thus, as exemplified in FIG. 2, when retracted, the camera unit 40 is invisible from the front. The display part 20 may be an example of a display part.

Figure 3:
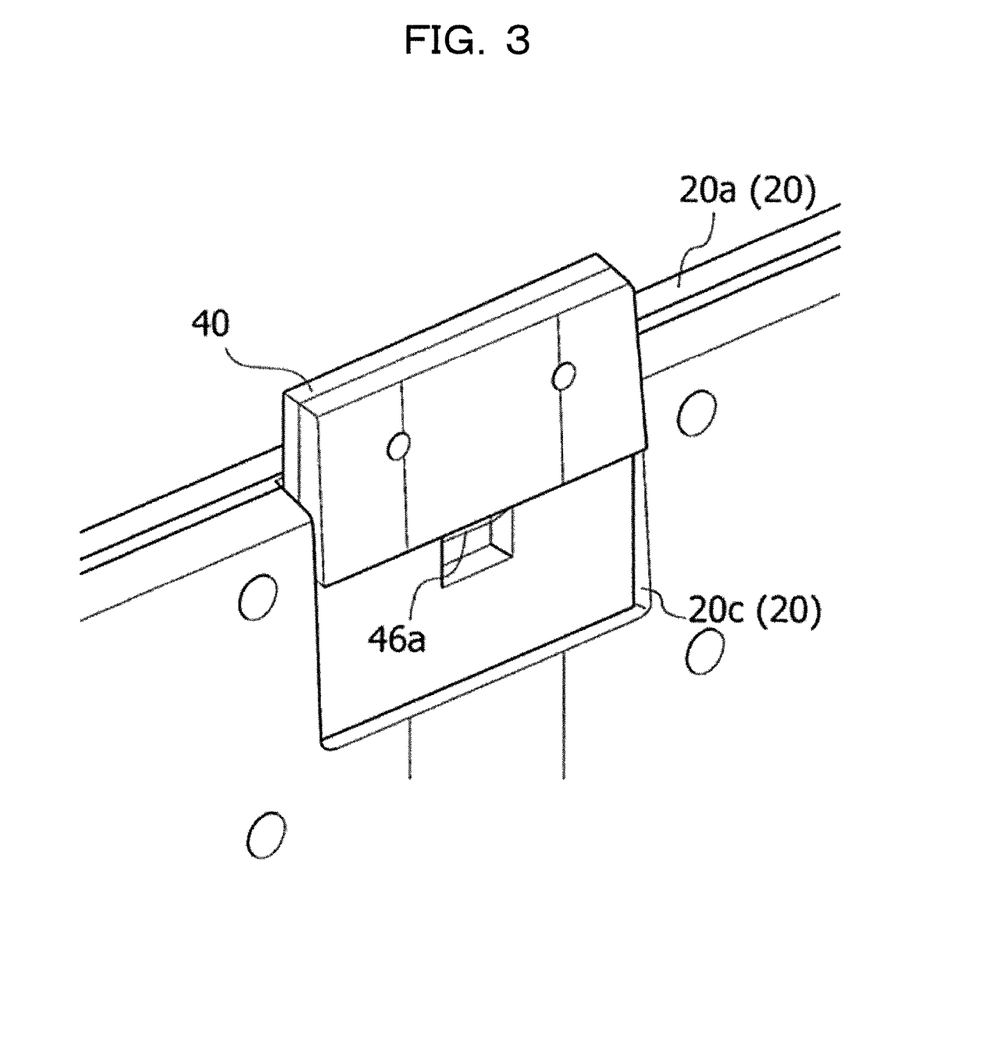
FIG. 3 is an exemplary rear view of the desktop PC with a camera unit extended.
Figure 4:
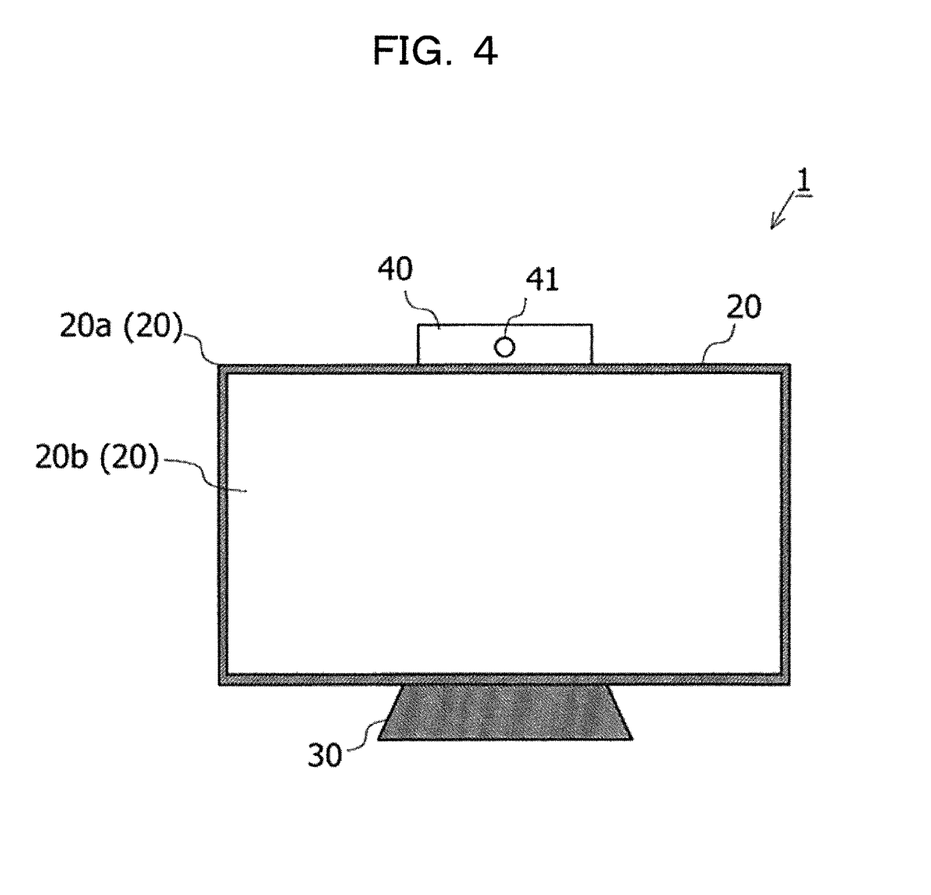
FIG. 4 is an exemplary front view of the desktop PC with the camera unit extended.

The camera unit 40 is capable of recording photographs and videos. The recorded photographs or videos are stored in, for example, the HDD of the body part 30. The camera unit 40 is brought to a recordable state when extended up. FIG. 3 is an exemplary rear view of the desktop PC with the camera unit extended. FIG. 4 is an exemplary front view of the desktop PC with the camera unit extended. FIG. 3 depicts a portion corresponding to an area A in FIG. 1. When the camera unit 40 is extended, a lens 41 of the camera unit 40 is directed to where a user of the desktop PC 1 may be. The state where the camera unit 40 is extended may be an example of a first state.

Figure 5:
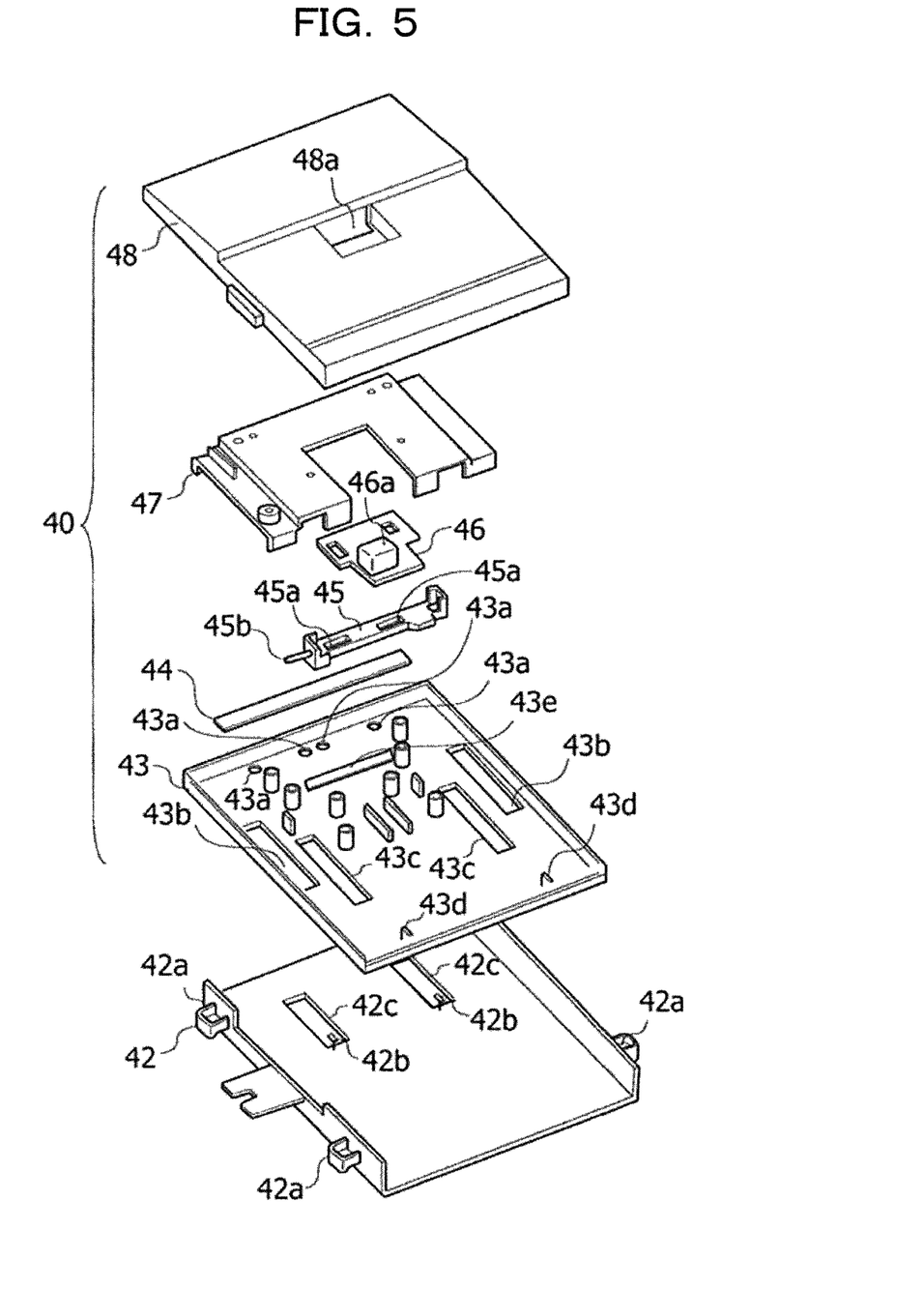
FIG. 5 is an exemplary exploded perspective view of the camera unit.

FIG. 5 is an exemplary exploded perspective view of the camera unit. The camera unit 40 is attached to the back surface of the display part 20 via a fixed cover 42. The camera unit 40 includes a front cover 43, a camera module 44, a lock component 45, an unlock component 46, a hold component 47, and a rear cover 48. The camera module 44, the lock component 45, the unlock component 46, and the hold component 47 may be sandwiched by the front cover 43 and the rear cover 48 to form the camera unit 40. The rear cover 48 may be the outer covering of the camera unit 40. The camera unit 40 may be an example of an imaging unit.

The fixed cover 42 is fixed to the recess 20c provided on the back surface of the display part 20. The fixed cover 42 includes threaded holes 42a, spring-upper-end attachment portions 42b, and lock hole portions 42c. The fixed cover 42 is fixed to the recess 20c of the display part 20 by, for example, screws screwed into the threaded holes 42a. The lock hole portions 42c are provided on the bottom surface of the fixed cover 42, one at the left and the other at the right. Although illustrated in FIG. 5 in a simplified form, the lock hole portions 42c may have substantially a letter-U shape.

The front cover 43 is placed over the fixed cover 42. The front cover 43 includes camera hole portions 43a, guide hole portions 43b, spring hole portions 43c, spring-lower-end attachment portions 43d, and a lock-component hole portion 43e. The camera hole portions 43a are arranged at positions to, in a plan view, coincide with the lens 41 and a microphone of the camera module 44 placed over the front cover 43. The guide hole portions 43b are provided on the bottom surface of the front cover 43, one at the left and the other at the right. The guide hole portions 43b are rectangular holes extending in the vertical direction of the front cover 43. The front cover 43 is slidable vertically, guided by screws screwed to the fixed cover 42 through the guide hole portions 43b. The spring hole portions 43c are provided on the bottom surface of the front cover 43, one at the left and the other at the right. The spring hole portions 43c are rectangular holes extending in the vertical direction of the front cover 43. To the spring-lower-end attachment portions 43d, the lower ends of coil springs are attached, with their upper ends attached to the spring-upper-end attachment portions 42b of the fixed cover 42. The lock-component hole portion 43e is a rectangular hole extending in the width direction of the front cover 43.

The camera module 44 may be a module including the lens 41, an image sensor, and a microphone. The image sensor may be, for example, a charge-coupled device (CCD) image sensor or a complementary metal-oxide semiconductor (CMOS) image sensor. The lens 41 of the camera module 44 is, in FIG. 5, directed towards the camera hole portions 43a of the front cover 43. The camera module 44 captures an object when the image sensor processes light passing through the lens 41. The camera module 44 may record sound with the microphone.

Figure 6:
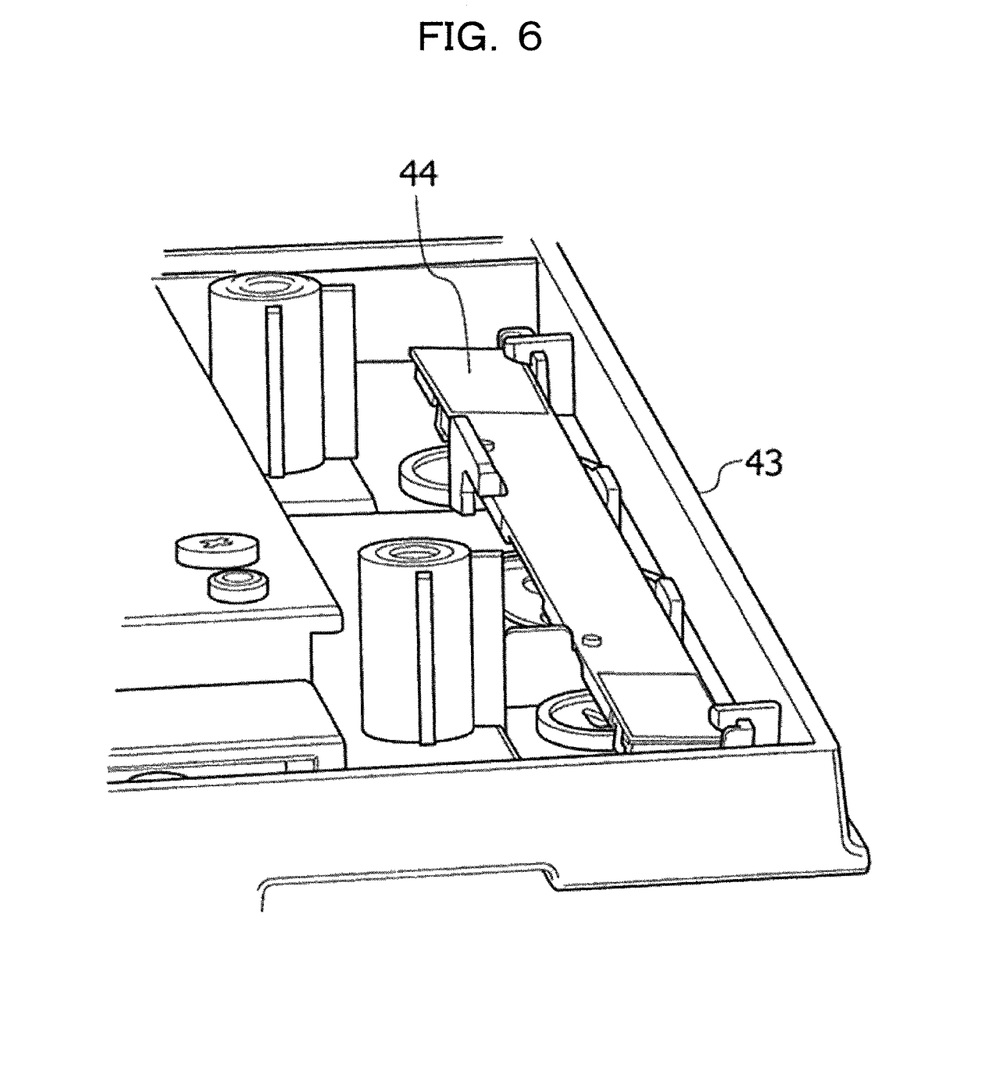
FIG. 6 is an exemplary state where a camera module is in place over a front cover.

FIG. 6 illustrates an example of a state where the camera module is in place over the front cover 43. The camera module 44 is attached to, for example, an upper portion of the front cover 43. The camera module 44 is attached so that the positions of the lens 41 and the microphone of the camera module 44 may coincide with the positions of the camera hole portions 43a of the front cover 43 in a plan view. The camera module 44 is attached in a slanted manner, with its upper edge closer to the front cover 43 than its lower edge.

Figure 7:
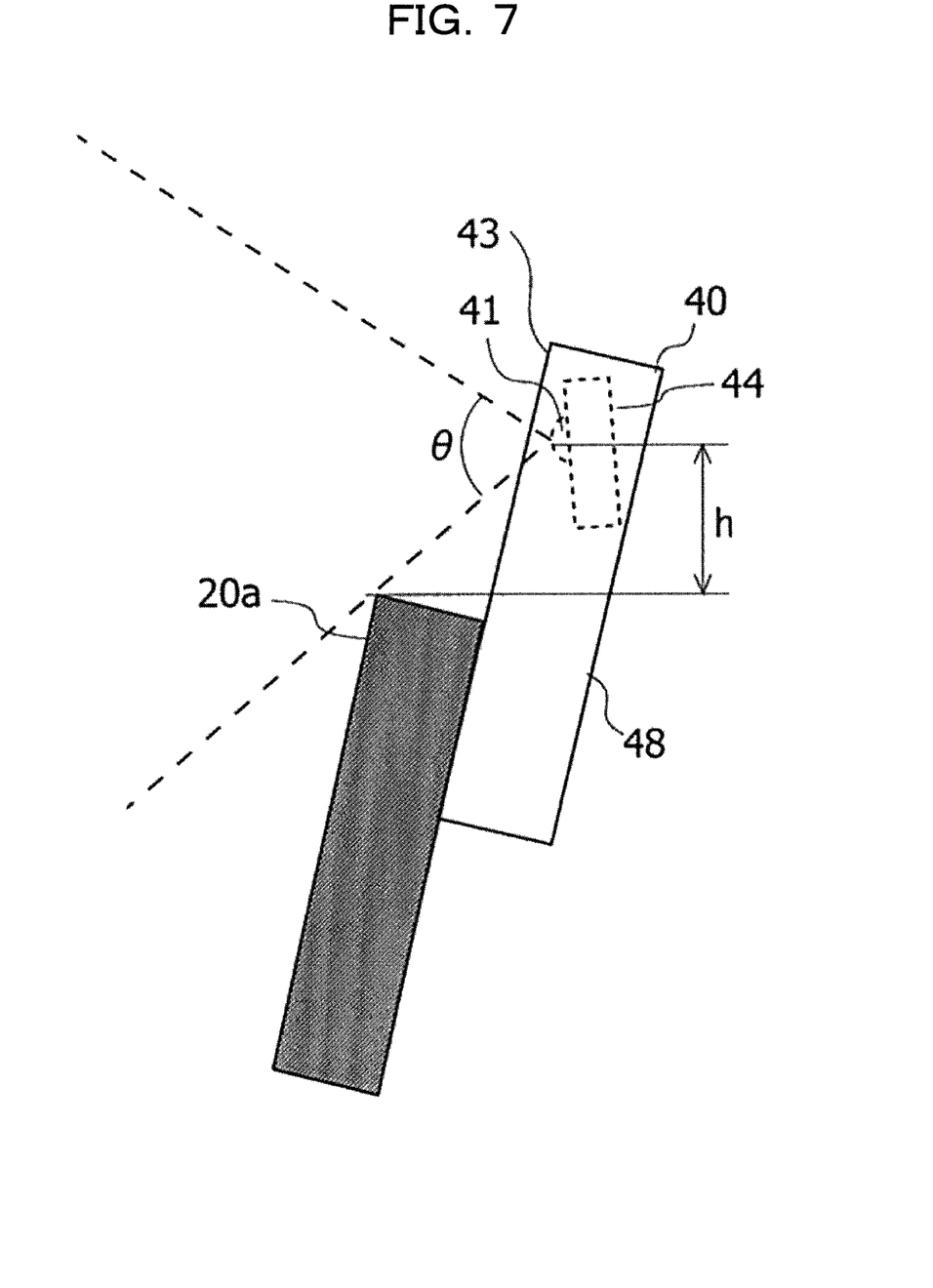
FIG. 7 is an exemplary side view of an upper portion of a display part.

FIG. 7 is an exemplary side view of the upper portion of the display part. In FIG. 7, the camera unit 40 provided at the upper portion of the display part 20 is extended up. The camera module 44 in the camera unit 40 is, in FIG. 7, depicted with dotted lines. Since the camera module 44 is slanted with its upper edge closer to the display part 20 than its lower edge, the optical axis of the lens 41 forms an angle of depression. The lens 41 thus faces an object straight, the object being, for example, a user of the desktop PC 1. The height h of the lens 41 from the frame 20a when the camera unit 40 is at the extended-up position may be determined appropriately based on factors such as the thickness of the frame 20a and an angle θ of view of the lens 41 so that the frame 20a may not be captured by the camera unit 40.

Referring back to FIG. 5, the lock component 45 is a member that locks the camera unit 40 in the extended-up state or the retracted-down state. The lock component 45 includes paired lock protrusions 45a and a spring shaft 45b. The lock protrusions 45a protrude from the surface of the lock component 45 on the rear cover 48 side towards the front cover 43. The lock protrusions 45a are fitted in the lock hole portions 42c of the fixed cover 42 through the lock-component hole portion 43e of the front cover 43. The lock protrusions 45a are fitted in the lock hole portions 42c to lock the camera unit 40 in the extended-up state or the retracted-down state. The lock component 45 has a slanted portion 45c on its surface on the front cover 43 side.

Figure 8:
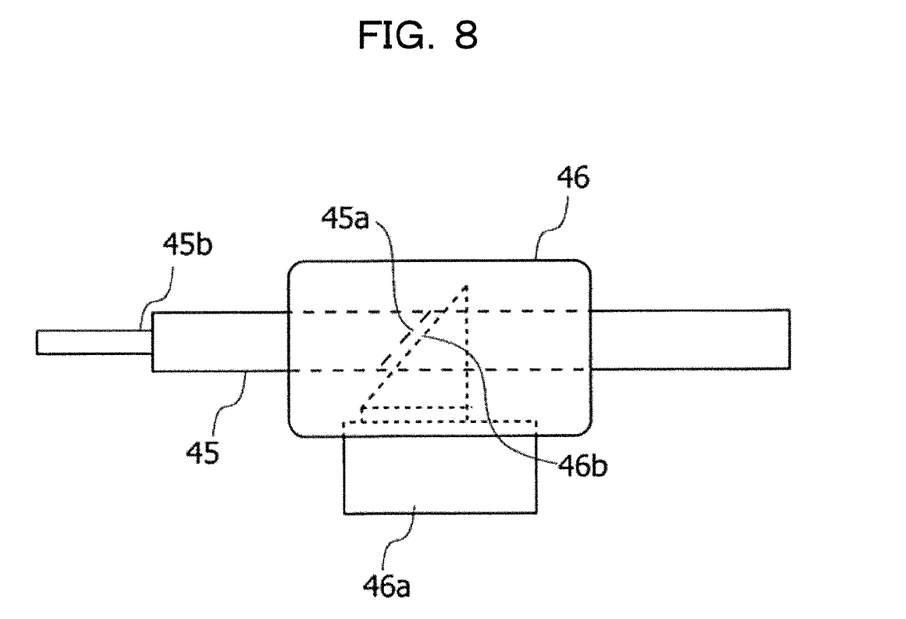
FIG. 8 is an exemplary plan view of a lock component and an unlock component in place.

The unlock component 46 may be a member that releases the restriction on the upward or downward movement of the camera unit 40 imposed by the lock component 45. The unlock component 46 has the unlock button 46a and an unlock slope portion 46b. The unlock slope portion 46b is a surface formed to contact the slanted portion 45c of the lock component 45. FIG. 8 is an exemplary plan view of the lock component and the unlock component in place. As illustrated in FIG. 8, a slanted portion 45c of the lock component 45 is substantially parallel to an unlock slope portion 46b. When a user pushes the unlock button 46a upward, the unlock component 46 moves upward. When the unlock component 46 moves upward, the lock component 45 moves leftward in FIG. 8, with the unlock slope portion 46b of the unlock component 46 in contact with the slanted portion 45c of the lock component 45. An upward movement of the unlock component 46, for example, is converted into a horizontal movement of the lock component 45 by the unlock slope portion 46b of the unlock component 46 and the slanted portion 45c of the lock component 45.

Figure 9:
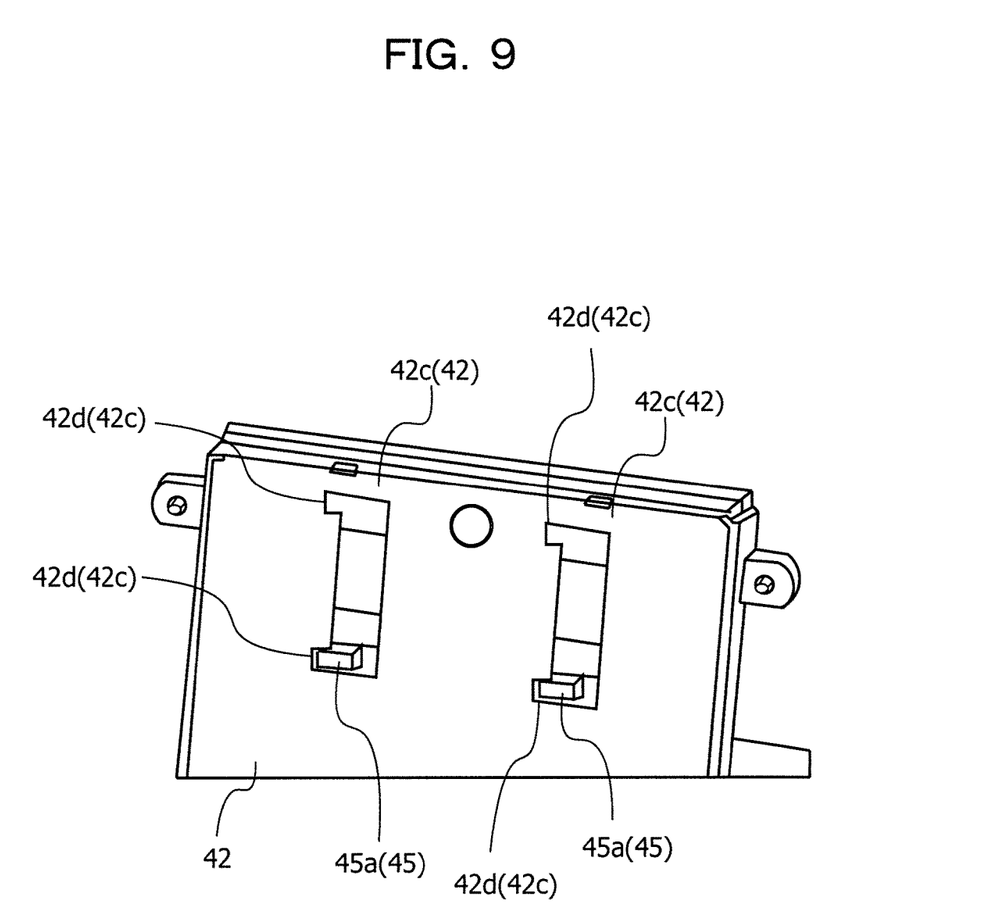
FIG. 9 is an exemplary front view of the camera unit.

FIG. 9 is an exemplary front view of the camera unit. As illustrated in FIG. 9, the lock hole portions 42c of the fixed cover 42 are each formed in substantially a letter-U shape having notched portions 42d in the upper and lower ends thereof, respectively. In FIG. 9, the lock protrusions 45a of the lock component 45 are fitted in the lower notched portions 42d of the lock hole portions 42c. Vertical movements of the camera unit 40 may be restricted by the lock protrusions 45a being fitted in the notched portions 42d. For example, when the unlock component 46 moves upward, the lock component 45 moves rightward in FIG. 9. When the lock component 45 moves rightward in FIG. 9, the lock protrusions 45a come out of the notched portions 42d. When the lock protrusions 45a come out of the notched portions 42d, the restriction imposed on the camera unit 40 by the lock component 45 is released, allowing the camera unit 40 to slide vertically. When the camera unit 40 the movement of which is unrestricted is extended upward, the lock protrusions 45a move along the lock hole portions 42c. Once the lock protrusions 45a reach the upper ends of the lock hole portions 42c, the lock protrusions 45a are fitted into the upper notched portions 42d. Vertical movements of the camera unit 40 may be restricted by the lock protrusions 45a being fitted in the upper notched portions 42d. After moving upward and being restricted in its vertical movement, the camera unit 40 maintains its recordable state. The fixed cover 42 having the lock hole portions 42c may be an example of a "rail member".

Figure 10:
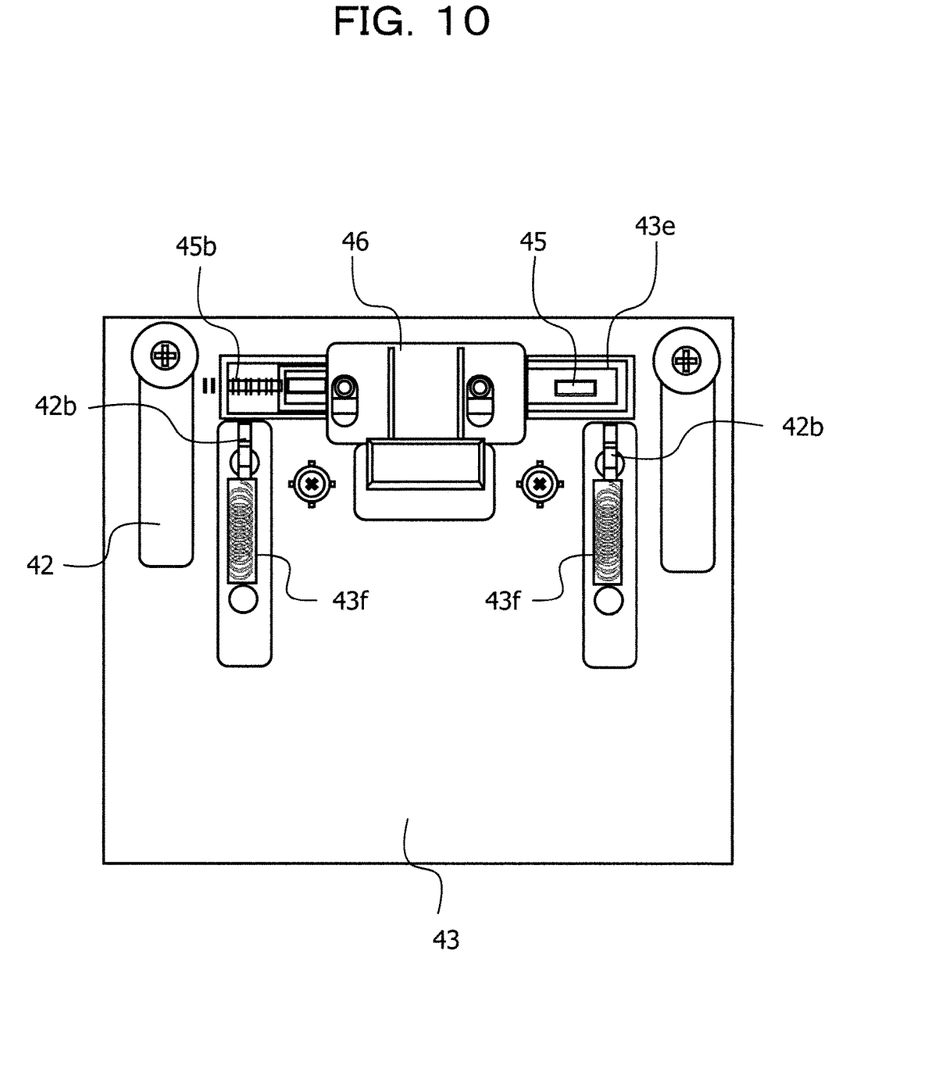
FIG. 10 is an exemplary plan view of the front cover, the camera module, the lock component, and the unlock component in place over a fixed cover.

FIG. 10 is an exemplary plan view of a state where the front cover, the camera module, the lock component, and the unlock component are in place over the fixed cover. In FIG. 10, the upper ends of coil springs 43f are attached to the spring-upper-end attachment portions 42b of the fixed cover 42. When the camera unit 40 is in use, the lower ends of the coil springs 43f are attached to the spring-lower-end attachment portions 43d of the front cover 43. The camera unit 40 extended up is biased downward by the elastic force of the coil springs 43f. The camera unit 40 extended up may thus be easily retracted. Another coil spring is provided around the spring shaft 45b of the lock component 45. The coil spring on the spring shaft 45b is supported at its one end by an end of the lock-component hole portion 43e of the front cover 43, and at the other end by the base of the spring shaft 45b. Thus, when the lock component 45 moves in an unlocking direction (leftward in FIG. 10), the elastic force generated by the coil spring on the spring shaft 45b biases the lock component 45 rightward in FIG. 10. When the camera unit 40 reaches its uppermost or lowermost position, the elastic force generated by the coil spring on the spring shaft 45b moves the lock component 45, causing the lock protrusions 45a of the lock component 45 to the notched portions 42d.

Referring back to FIG. 5, the hold component 47 sandwiches, together with the front cover 43, the camera module 44, the lock component 45, and the unlock component 46. The hold component 47 has substantially a letter-U shape. The space formed inside the letter-U shape of the hold component 47 provides an area for the unlock button 46a to move. The rear cover 48 sandwiches, together with the front cover 43, the camera module 44, the lock component 45, the unlock component 46, and the hold component 47, as described earlier. The rear cover 48 is provided with an unlock-button hole portion 48a. The unlock button 46a is exposed to the outside through the unlock-button hole portion 48a. A user of the desktop PC 1 may push the unlock button 46a exposed through the unlock-button hole portion 48a.

Figure 11:
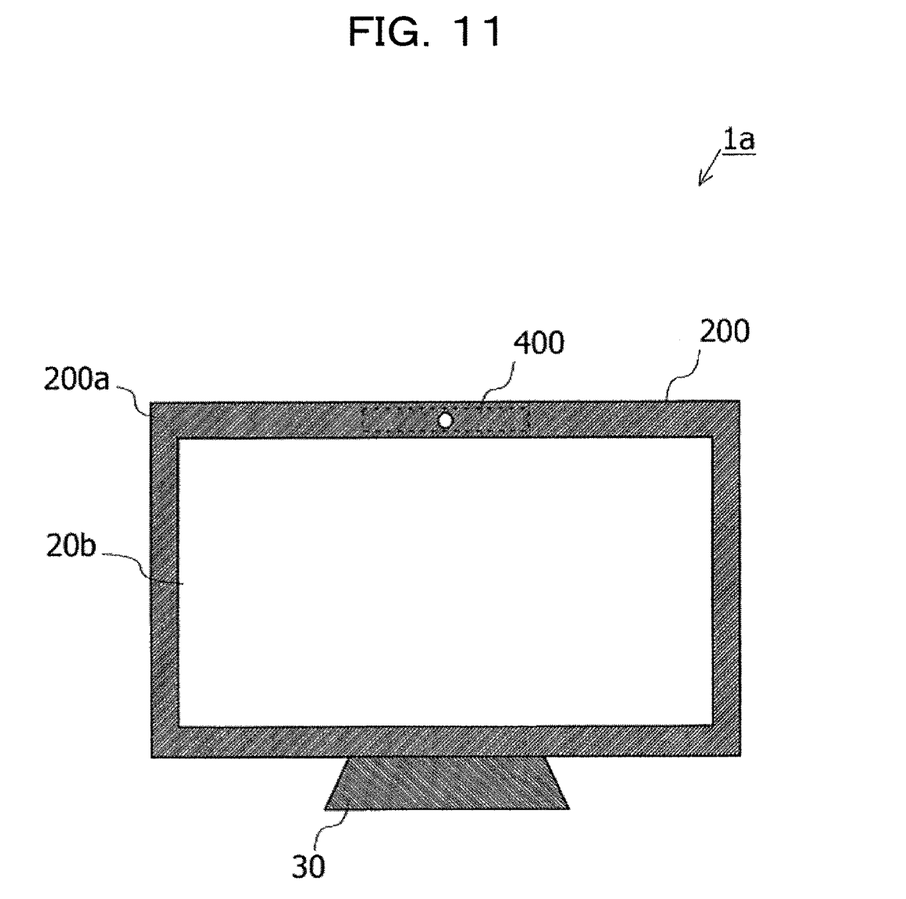
FIG. 11 illustrates an exemplary desktop PC.

FIG. 11 illustrates an example of a desktop PC. Components in FIG. 11 that are substantially the same as or similar to those in FIGS. 1 to 10 may be denoted by the same reference numerals as those in FIGS. 1 to 10 and not be described below. A desktop PC 1a depicted in FIG. 11 has a camera unit 400 housed within a frame 200a of a display part 200. The frame 200a is accordingly wide enough to accommodate the camera unit 400. This may make it difficult for the frame 200a of the desktop PC 1a in FIG. 11 to have a narrow width, compared to the frame 20a of the desktop PC 1 shown in FIGS. 1 to 10.

In the display apparatus illustrated in FIGS. 1 to 10, the camera unit 40 is mounted not within the frame 20a, but in the recess 20c on the back surface of the display part 20. The frame 20a of the desktop PC 1 in FIGS. 1 to 10 therefore does not have to be wide enough to accommodate the camera unit 40. This may enable the frame 20a of the desktop PC 1 in FIGS. 1 to 10 to be narrower than that of the desktop PC 1a in FIG. 11.

When retracted in the recess 20c, the camera unit 40 is in a position invisible from the front. Since the camera unit 40 does not protrude from the display part 20 when retracted in the recess 20c, the desktop PC 1 in FIGS. 1 to 10 may be, for example, less disfigured by the camera unit 40.

When the camera unit 40 in FIGS. 1 to 10 is retracted in the recess 20c of the desktop PC 1, the lens 41 of the camera module 44 is not exposed to the outside. Thus, adhesion of dirt to the lens 41 may be reduced. With the lens 41 not exposed to the outside, recording unintended by a user may be reduced, the unintentional recording possibly caused by, for example, a malware infection of the desktop PC 1 or an erroneous operation by the user.

When the camera unit 40 in FIGS. 1 to 10 is in a recordable state, the optical axis of the lens 41 of the camera module 44 forms an angle of depression. Thus, the lens 41 of the camera module 44 in the desktop PC 1 may easily face a user of the desktop PC 1 straight.

The desktop PC 1 may be applicable as an example of a display apparatus equipped with a camera. A display apparatus that may be equipped with the above-described camera unit 40 is not limited to the desktop PC 1. The camera unit 40 may be mounted on, for example, a display apparatus for a personal computer or a digital television.

Figure 12:
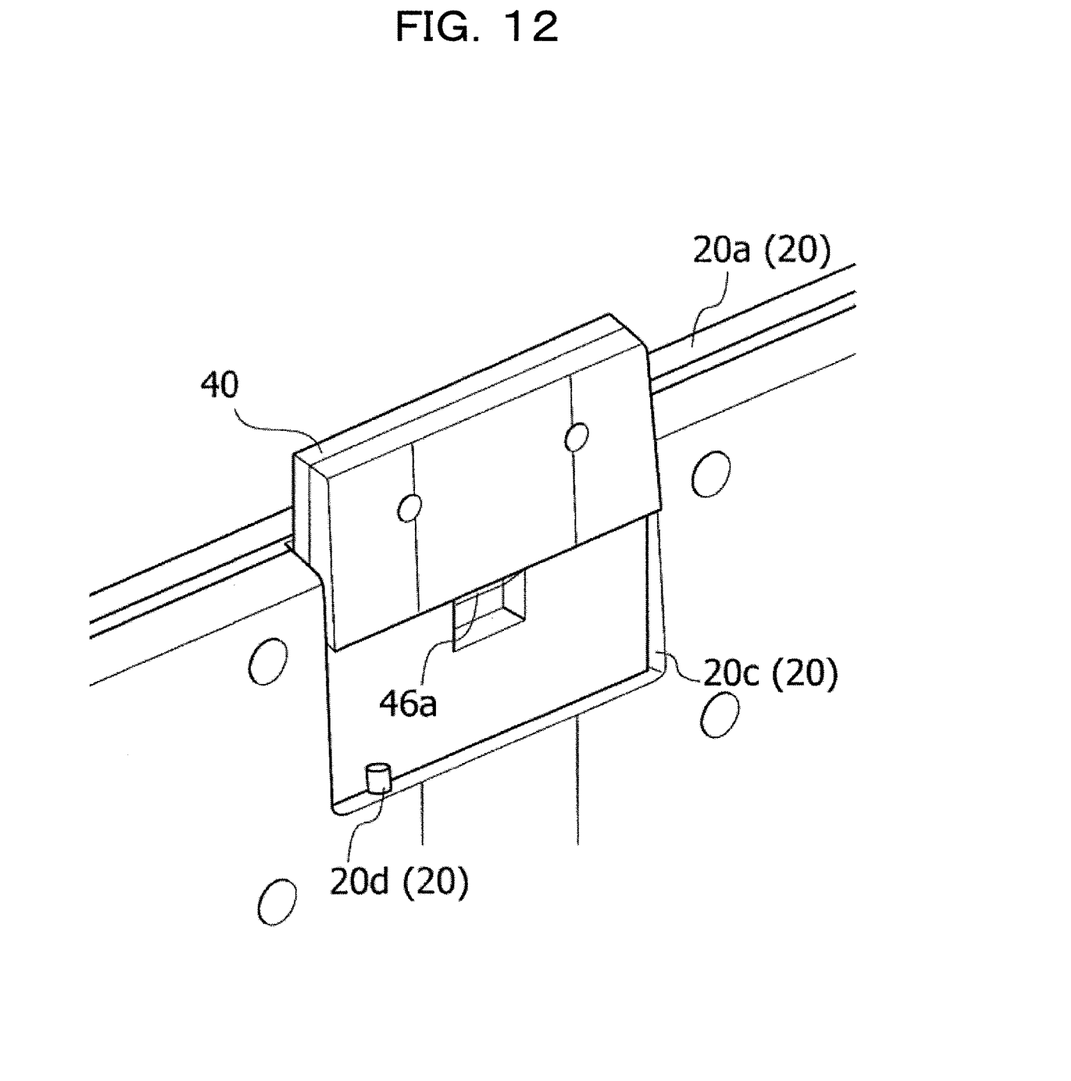
FIG. 12 illustrates an exemplary desktop PC having a mechanical switch in a recess.

The desktop PC 1 may include a detector that detects when the camera unit 40 is retracted in the recess 20c. Any of various detectors, such as publicly known ones, may be employed as long as the detector is able to detect when the camera unit 40 is retracted in the recess 20c. Examples of a detector include a proximity sensor, a mechanical switch, and a contact switch. FIG. 12 illustrates an exemplary desktop PC. FIG. 12 depicts the desktop PC 1 having a mechanical switch 20d provided on the recess 20c. The desktop PC 1 in FIG. 12 is viewed in the same direction as that in FIG. 3. When retracted in the recess 20c, the camera unit 40 pushes the mechanical switch 20d down. The desktop PC 1 may detect that the camera unit 40 is housed in the recess 20c when the mechanical switch 20d is depressed. When detecting that the camera unit 40 is retracted in the recess 20c, the desktop PC 1 may stop the power supply to the camera unit 40. Stopping the power supply to the camera unit 40 may reduce the power consumed by the desktop PC. Stopping the power supply to the camera unit 40 may also reduce recording of photographs, videos, or sound unintended by a user.

The coil springs 43f may be provided to bias the camera unit 40, for example, downward. The coil springs 43f may be provided to bias the camera unit 40, for example, upward. Biasing the camera unit 40 upward with the coil springs 43f may help the camera unit 40 slide up when the unlock button 46a is pushed up.

The camera unit 40 may be provided in the upper portion of the back surface of the display part 20. For example, the location of the camera unit 40 is not limited to the upper portion of the back surface of the display part 20. The camera unit 40 may be provided at any location as long as it is on the back surface of the display part 20 and allows the lens 41 to be exposed in the recordable state and to be located behind the back surface of the display part 20 in the retracted state. The camera unit 40 may for example be provided at the left or right area of the back surface of the display part 20.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A display apparatus comprising:
   a display;
   a rail provided on a back surface of the display and configured to extend in a direction; and
   a housing placed in engagement with the rail and including a camera with a lens configured to be exposed outside the display in a first state in which the camera is moved to a first end of the rail, and to be located behind the back surface of the display in a second state in which the camera is moved to a second end of the rail;
   a lock portion configured to lock the camera in one of the first state and the second state and including a lock protrusion which is fitted in a lock hole provided in the rail, a spring shaft and a lock slope portion; and
   an unlock portion configured to unlock the camera which is locked and including an unlock button and an unlock slope portion configured to move in the direction with being contact with the lock slope portion when the unlock button is pushed.

2. The display apparatus according to claim 1, wherein an optical axis of the lens forms an angle of depression by slanting an upper edge of the camera toward a side of the display than a lower edge of the camera.

3. The display apparatus according to claim 1, wherein the second end of the rail is provided at a position at which the camera in the second state does not protrude from the display.

4. The display apparatus according to claim 1, further comprising
   a detector that detects that the camera is in the second state,
   wherein a power supply to the camera is stopped when the detector detects that the camera is in the second state.

5. The display apparatus according to claim 1, wherein the camera includes an image sensor configured to processes light which passes through the lens.

6. A display apparatus comprising:
   a display;
   a recess provided on a back surface of the display; and
   a housing housed in the recess and including a camera with a lens, configured to slide upward and downward along a rail which extends in a direction, and cause the lens to be exposed outside the display in a case where the camera is at an upper position of the rail;
   a lock portion configured to lock the camera in one of the upper position and a lower position of the rail and including a lock protrusion which is fitted in a lock hole provided in the rail, a spring shaft and a lock slope portion; and
   an unlock portion configured to unlock the camera which is locked and including an unlock button and an unlock slope portion configured to move in the direction with being contact with the lock slope portion when the unlock button is pushed.

7. The display apparatus according to claim 6, wherein an optical axis of the lens forms an angle of depression by slanting an upper edge of the camera toward a side of the display than a lower edge of the camera.

8. The display apparatus according to claim 6, wherein the lens is located behind the back surface of the display in a case where the camera is at the lower position of the rail.

9. The display apparatus according to claim 8, further comprising
   a detector that detects that the camera positions at the lower position of the rail,
   wherein a power supply to the camera is stopped when the detector detects that the camera positions at the lower position of the rail.

10. The display apparatus according to claim 6, wherein the camera includes an image sensor configured to processes light which passes through the lens.

* * * * *

UNITED STATES PATENT AND TRADEMARK OFFICE
CERTIFICATE OF CORRECTION

PATENT NO.        : 10,142,525 B2
APPLICATION NO.   : 15/677154
DATED             : November 27, 2018
INVENTOR(S)       : Tadanori Tachikawa Page 1 of 1

It is certified that error appears in the above-identified patent and that said Letters Patent is hereby corrected as shown below:

In the Claims

Column 8, Line 8:
In Claim 6, delete "lens," and insert -- lens --, therefor.

Signed and Sealed this
Twelfth Day of February, 2019

Andrei Iancu
*Director of the United States Patent and Trademark Office*